(12) United States Patent
Gould et al.

(10) Patent No.: US 10,751,821 B2
(45) Date of Patent: Aug. 25, 2020

(54) METHODS FOR ASSEMBLING METALLIC SANDWICH AND HONEYCOMB STRUCTURES

(71) Applicant: EDISON WELDING INSTITUTE, INC., Columbus, OH (US)

(72) Inventors: Jerry E. Gould, Columbus, OH (US); Sam Lewis, Columbus, OH (US)

(73) Assignee: Edison Welding Institute, Inc., Columbus, OH (US)

( * ) Notice: Subject to any disclaimer, the term of this patent is extended or adjusted under 35 U.S.C. 154(b) by 803 days.

(21) Appl. No.: 15/250,135

(22) Filed: Aug. 29, 2016

(65) Prior Publication Data

US 2017/0056993 A1  Mar. 2, 2017

Related U.S. Application Data

(60) Provisional application No. 62/211,395, filed on Aug. 28, 2015.

(51) Int. Cl.
| | | |
|---|---|---|
| *B23K 1/005* | (2006.01) | |
| *B23K 1/00* | (2006.01) | |
| *B23K 1/20* | (2006.01) | |
| *B23K 101/18* | (2006.01) | |
| *B23K 103/16* | (2006.01) | |

(52) U.S. Cl.
CPC ......... *B23K 1/0004* (2013.01); *B23K 1/0014* (2013.01); *B23K 1/20* (2013.01); *B23K 2101/18* (2018.08); *B23K 2103/166* (2018.08)

(58) Field of Classification Search
CPC .. B23K 1/0004; B23K 1/0006; B23K 1/0014; B23K 1/0008

USPC .......... 219/85.15, 78.01, 85.1, 85.12, 85.13, 219/78.11, 78.12
See application file for complete search history.

(56) References Cited

U.S. PATENT DOCUMENTS

| | | | | |
|---|---|---|---|---|
| 4,069,187 | A * | 1/1978 | Miller | C09C 1/28 524/247 |
| 4,342,899 | A * | 8/1982 | Campbell | B23K 11/0093 219/78.12 |
| 4,443,678 | A * | 4/1984 | Jacovides | B23K 1/0014 219/615 |
| 4,918,281 | A * | 4/1990 | Blair | B23K 20/16 219/78.02 |
| 5,504,296 | A * | 4/1996 | Sato | B23K 1/0004 219/85.1 |
| 5,524,406 | A * | 6/1996 | Ragland | B23K 11/087 219/117.1 |
| 6,288,008 | B1 * | 9/2001 | Matsumoto | B01J 35/04 422/180 |
| 2007/0028432 | A1 * | 2/2007 | Evans | B29B 17/02 29/18.1 |

(Continued)

FOREIGN PATENT DOCUMENTS

| | | | |
|---|---|---|---|
| JP | 56158271 | A * | 12/1981 |
| JP | 2006102761 | A * | 4/2006 |

*Primary Examiner* — Lorne E Meade
*Assistant Examiner* — Ayub A Maye
(74) *Attorney, Agent, or Firm* — Frost Brown Todd LLC

(57) ABSTRACT

A method for creating metallic sandwich structures that includes providing at least two face sheets; providing at least two core sheets; orienting the core sheets relative to one another in a predetermined manner; and using indirect resistance roll brazing to join the core sheets to the face sheets to create a sandwich structure.

11 Claims, 2 Drawing Sheets

(56) References Cited

U.S. PATENT DOCUMENTS

| | | | |
|---|---|---|---|
| 2008/0292898 A1* | 11/2008 | Straza | B23K 1/0008 |
| | | | 428/574 |
| 2010/0176090 A1* | 7/2010 | Lochtman | B32B 37/24 |
| | | | 216/95 |
| 2013/0244051 A1* | 9/2013 | Matsumoto | B23K 35/0238 |
| | | | 428/576 |
| 2016/0207129 A1* | 7/2016 | Ritchey | B23K 1/0008 |

* cited by examiner

METHODS FOR ASSEMBLING METALLIC SANDWICH AND HONEYCOMB STRUCTURES

CROSS-REFERENCE TO RELATED APPLICATIONS

This patent application claims the benefit of U.S. Provisional Patent Application Ser. No. 62/211,395 filed on Aug. 28, 2015 and entitled "Methods for Assembling Metallic Sandwich and Honeycomb Structures" the disclosure of which is hereby incorporated by reference herein in its entirety and made part of the present U.S. utility patent application for all purposes.

BACKGROUND OF THE INVENTION

The described invention relates in general to resistance and solid state welding methods and processes and more specifically to methods and processes for creating metallic sandwich and honeycomb structures. Indirect resistance brazed metallic sandwich materials are of interest to both the automotive and aerospace industries, therefore there is an ongoing need for cost-effectively fabricating such materials.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a method for creating metallic sandwich structures is provided. This method includes providing at least two metallic face sheets; providing at least two metallic core sheets; orienting the core sheets relative to one another in a predetermined manner; and using indirect resistance roll brazing to join the core sheets to the face sheets to create a sandwich structure.

In accordance with another aspect of the present invention, a method for creating metallic honeycomb panels is provided. This method includes providing base materials, wherein the base materials are components of metallic sandwich structures; identifying certain predetermined metallurgical requirements of the base materials; selecting predetermined coatings for the base materials based on the predetermined metallurgical requirements, wherein the predetermined coatings form interlayers that facilitate the joining of the of metallic sandwich structures to one another; applying the predetermined coatings to the base materials; and using indirect resistance brazing or indirect resistance roll brazing to join the metallic sandwich structures to one another to form honeycomb panels or structures.

In yet another aspect of this invention, a method for creating metallic sandwich structures is provided. This method includes providing at least two metallic face sheets; providing at least one metallic core sheet, wherein the core sheet has been pre-plated with an active coating; and using indirect resistance brazing to activate the coating and join the core sheets to the face sheets to create a sandwich structure.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DESCRIPTION OF THE INVENTION

Exemplary embodiments of the present invention are now described with reference to the Figures. Although the following detailed description contains many specifics for purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

Figure 1:
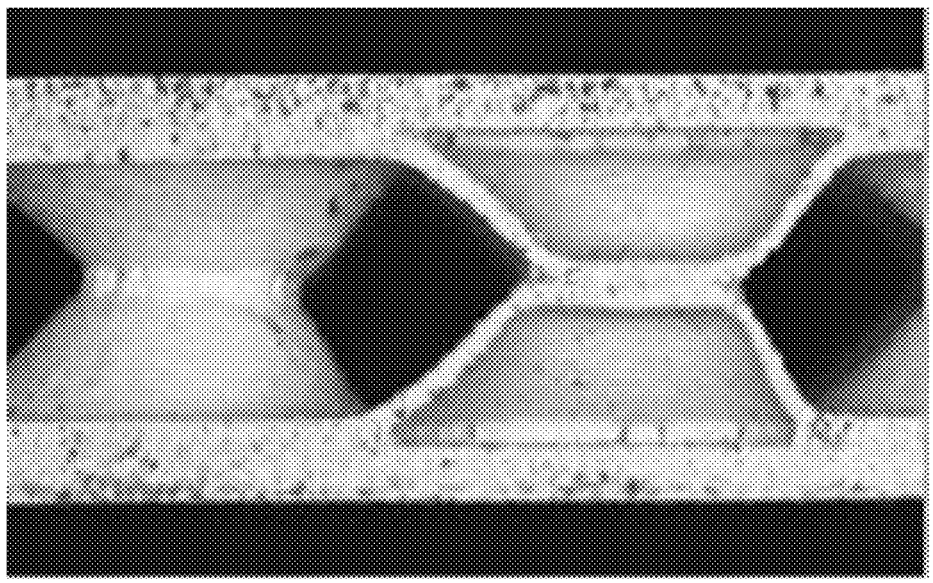
FIG. 1 provides an image of a cross-section of a thin gauge metallic sandwich structure material showing face and core sheets brazed together.
Figure 2:
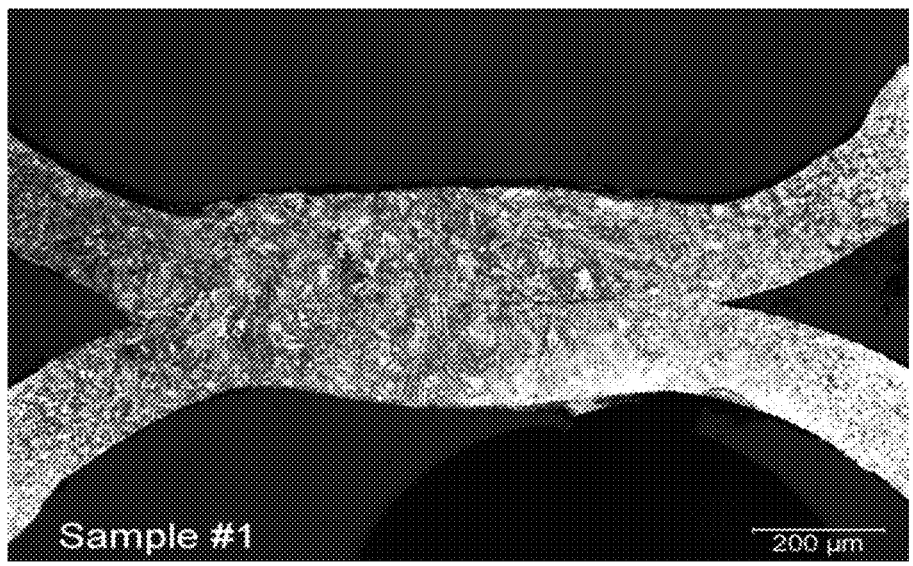
FIG. 2 provides an image of an example of a resistance spot braze made between thin gauge core sheets providing relative positioning.

A first general aspect of this invention provides positioning of core sheets for proper geometric profiles while creating metallic sandwich structures using indirect resistance roll brazing. Such proper positioning facilitates both geometric stability and mechanical performance of the final assembled product. Indirect resistance roll brazing (IRRB) is a novel technology used for the assembly of metallic metal sandwich structures. These structures typically involve: (i) two face sheets; and (ii) one or two core sheets. An example of a sandwich structure utilizing two core sheets is shown in FIG. 1. Clearly visible in FIG. 1 are both the brazing used to create the final structure and the relative orientation between the core sheets. The present invention maintains proper orientation of these core sheets relative to one another during fabrication. A first embodiment includes a method that provides localized resistance brazes between the core sheets prior to incorporation into the IRRB processed product. An example of a resistance braze between two core sheets is shown in FIG. 2, wherein spot brazes have been made prior to IRRB processing. A second method utilizes positioning rolls that include protrusions that engage dimple structures present on the core sheets. Orientation of the rolls then facilitates orientation of the core sheets for continuous IRRB processing. Novel features of this aspect of the present invention include: (i) a resistance brazing method applicable to inter-dimple connections between core sheets; (ii) a roll-based orientation method integral to continuous processing IRRB sandwich structures; and (iii) a two-stage process that first provides core sheet orientation, followed by full IRRB assembly. This first aspect of the present invention would reduce plating costs roughly ½ to ⅔ for indirect resistance brazed sandwich products.

Figure 3:
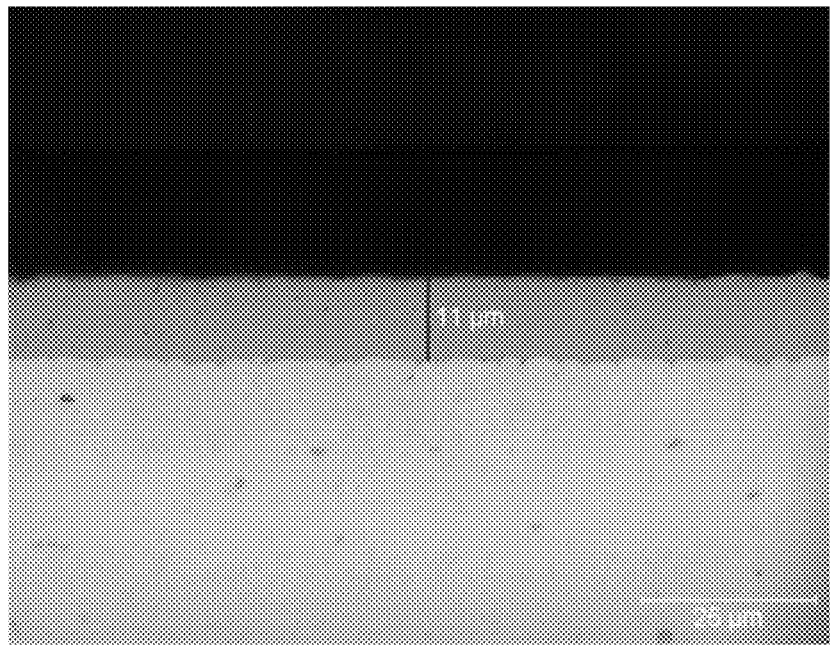
FIG. 3 is an image of the morphology of a Ni-braze layer on an IN625 substrate.
Figure 4:
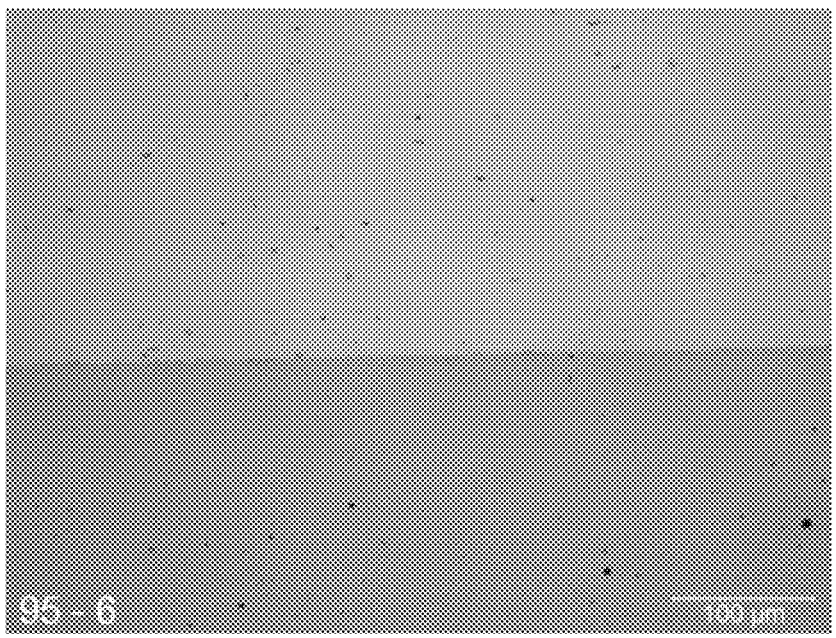
FIG. 4 is an image of the microstructure of a resistance braze joint made between steel and IN625.

A second general aspect of the present invention provides designed interlayers for production of low cost honeycomb panels and to provide flexibility in selecting interlayer coatings for indirect resistance roll brazing of honeycomb products. The invention includes identifying metallurgical requirements of the base materials, and then selecting appropriate coatings to facilitate joining of sandwich products using IRRB. Process or method considerations include not only metallurgical compatibility, but methods of application, necessary coating thicknesses, and any necessary shielding in assembly of the final product. Existing efforts at indirect resistance brazing (IRB) or indirect resistance roll brazing (IRRB) have been executed using low cost pre-coated steels. For development purposes, zinc has been the braze alloy and is readily available on thin gauge galvanized steels. Characteristics of the desired braze layer include a material that (i) is of a defined melting point, (ii) can be cheaply applied to the substrate, (iii) is sufficiently thin (<100-μm), and (iv) offers oxidation protection to workpiece surfaces. With reference to FIGS. 3-4, this invention is directed to coating and process selection and includes a suite of coatings that provide the potential to optimize coating melting points, application methods, and resulting joint strengths. Examples of candidate coatings include tin and aluminum based coatings (provided by hot dipping), as well as Ni—P (deposited by electroless coating). Such coatings have been demonstrated to be effective bonding agents during resistance brazing. Novel features of this aspect of the present invention include: (i) use of interlayers for large area bonding of sheet materials; (ii) interlayer selection tied to base material metallurgy; (iii) a range of interlayers based on base materials, operating temperatures, and performance requirements; and (iv) interlayer selection based on deposition mechanisms resulting in large area coverage and thin applied thicknesses. This second aspect of the present invention would also reduce plating costs roughly ½ to ⅔ for indirect resistance brazed sandwich products.

A third general aspect of the present invention provides an assembly of sandwich structured metallic materials using pre-plated core sheets. This aspect of the invention includes two major benefits. First, a cost reduction is associated with only providing the active coating on the core sheet(s). Second, the approach restricts any applied activation coatings to the interior of the product, which has the benefit of enhancing surface quality to the exposed surface of the product. Research has demonstrated the ability to create continuous metal-cored sandwich metal products with indirect resistance heating using pre-plated sheet materials. Initial research was done using zinc (a galvanized steel product) as the coating on both core and face sheets. Additional research demonstrated that when active braze materials were used (e.g., Ni—P for steel), plating need only be done to one of the components. Thus, this aspect of the invention addresses indirect resistance brazing of metallic sandwich materials with only the core sheets coated. Novel features of this aspect of the present invention include: (i) selection of appropriate active brazing materials; (ii) separate material processing of the face sheets and the cores; and (iii) processing to enable the activation material to bond the plated cores to the face sheets. This third aspect of the present invention would also reduce plating costs roughly ½ to ⅔ for indirect resistance brazed sandwich products.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A method for creating metallic sandwich structures, comprising:
    (a) providing at least two face sheets;
    (b) providing at least two core sheets, wherein the at least two core sheets further include dimple structures formed thereon;
    (c) orienting the core sheets relative to one another in a predetermined manner; and
    (d) joining the core sheets to the face sheets to create a sandwich structure using indirect resistance roll brazing, wherein the use of indirect resistance roll brazing further includes the use of positioning rolls, wherein the positioning rolls further include protrusions formed thereon, wherein the protrusions engage the dimple structures formed on the core sheets for properly orienting the positioning rolls on the dimple structures, and wherein properly orienting the positioning rolls on the dimple structures facilitates orientation of the core sheets for creating the sandwich structure.

2. The method of claim 1, further including creating spot brazes between the oriented core sheets prior to using indirect resistance roll brazing to join the core sheets to the face sheets to create a sandwich structure.

3. A method for creating metallic honeycomb panels, comprising:
    (a) providing base materials, wherein the base materials are components of metallic sandwich structures;
    (b) identifying predetermined metallurgical requirements of the base materials;
    (c) selecting predetermined coatings for the base materials based on the predetermined metallurgical requirements, wherein the predetermined coatings form interlayers that facilitate the joining of the metallic sandwich structures to one another;
    (d) applying the predetermined coatings to the base materials; and
    (e) joining the metallic sandwich structures to one another to form honeycomb panels or structures using indirect resistance brazing or indirect resistance roll brazing, wherein the use of indirect resistance brazing or indirect resistance roll brazing further includes the use of positioning rolls, wherein the positioning rolls further include protrusions formed thereon, wherein the protrusions engage dimple structures formed in the metallic sandwich structures for properly orienting the positioning rolls on the dimple structures, and wherein properly orienting the positioning rolls on the dimple structures facilitates orientation of the metallic sandwich structures for joining the metallic sandwich structures to one another to form the honeycomb panels or structures.

4. The method of claim 3, wherein the coatings include nickel, tin, and aluminum based coatings.

5. The method of claim 4, wherein the coatings are applied by hot dripping.

6. The method of claim 3, wherein the coatings include nickel-phosphorus.

7. The method of claim 6, wherein the coatings are applied by electroless coating.

8. A method for creating metallic sandwich structures, comprising:
   (a) providing at least two face sheets;
   (b) providing at least one core sheet, wherein the at least one core sheet has been pre-plated with an active coating, and wherein the at least one core sheet further includes dimple structures formed thereon; and
   (c) joining the at least one core sheet to the face sheets to create a sandwich structure using indirect resistance roll brazing to activate the coating, wherein the use of indirect resistance roll brazing further includes the use of positioning rolls, wherein the positioning rolls further include protrusions formed thereon, wherein the protrusions engage the dimple structures formed on the at least one core sheet for properly orienting the positioning rolls on the dimple structures, and wherein properly orienting the positioning rolls on the dimple structures facilitates orientation of the at least one core sheet for joining the at least one core sheet to the face sheets to create the sandwich structure.

9. The method of claim 8, wherein the active coating is zinc.

10. The method of claim 8, wherein the active coating is nickel-phosphorus.

11. The method of claim 10, wherein the nickel-phosphorus is applied by electroless coating.

\* \* \* \* \*